US009935832B2

(12) United States Patent
Johnsson et al.

(10) Patent No.: US 9,935,832 B2
(45) Date of Patent: Apr. 3, 2018

(54) AUTOMATED PLACEMENT OF MEASUREMENT ENDPOINT NODES IN A NETWORK

(71) Applicant: Telefonaktiebolaget L M Ericsson (publ), Stockholm (SE)

(72) Inventors: Andreas Johnsson, Uppsala (SE); Catalin Meirosu, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 266 days.

(21) Appl. No.: 14/408,255

(22) PCT Filed: Jun. 19, 2014

(86) PCT No.: PCT/SE2014/050758
§ 371 (c)(1),
(2) Date: Dec. 15, 2014

(87) PCT Pub. No.: WO2015/195013
PCT Pub. Date: Dec. 23, 2015

(65) Prior Publication Data
US 2016/0218927 A1 Jul. 28, 2016

(51) Int. Cl.
*H04L 12/24* (2006.01)
*H04L 12/26* (2006.01)

(52) U.S. Cl.
CPC ...... *H04L 41/0823* (2013.01); *H04L 41/0806* (2013.01); *H04L 41/0859* (2013.01);
(Continued)

(58) Field of Classification Search
CPC ............... H04J 14/0257; H04J 14/0238; H04J 14/0267; H04L 45/16
See application file for complete search history.

(56) References Cited

U.S. PATENT DOCUMENTS 6,868,094 B1 * 3/2005 Bordonaro .......... H04L 41/5009
370/516
7,606,895 B1 10/2009 Dini et al.
(Continued)

OTHER PUBLICATIONS

International Search Report for International Application No. PCT/SE2014/050758, dated Aug. 21, 2014, 4 pages.
(Continued)

*Primary Examiner* — Yemane Mesfin
*Assistant Examiner* — Henry Baron
(74) *Attorney, Agent, or Firm* — Sage Patent Group (57) ABSTRACT

Mechanisms for designating particular nodes in a network as measurement endpoint (MEP) nodes are disclosed. Network topology information that identifies a plurality of nodes and communication links in a network is accessed. An initial chromosome generation is established. Each chromosome in the chromosome generation comprises a structure that identifies each node in the plurality of nodes that has an MEP capability and that includes an MEP state indicator for each node. A succession of a plurality of chromosome generations are generated by evolving each chromosome generation into a successive chromosome generation based on a genetic selection function and a fitness function until a threshold condition is met. An optimal chromosome from a successive chromosome generation is determined. A configuration command is sent to each node in a subset of the nodes that configures each node to operate as a MEP node.

19 Claims, 8 Drawing Sheets

(52) U.S. Cl.
CPC ............ *H04L 41/12* (2013.01); *H04L 43/087* (2013.01); *H04L 43/0817* (2013.01); *H04L 43/0829* (2013.01); *H04L 43/0858* (2013.01); *H04L 43/0864* (2013.01); *H04L 43/10* (2013.01)

(56) References Cited

U.S. PATENT DOCUMENTS

| | | | |
|---|---|---|---|
| 2011/0063972 | A1 | 3/2011 | Muley et al. |
| 2012/0096143 | A1 | 4/2012 | Suit |
| 2012/0185553 | A1 | 7/2012 | Nelson |
| 2014/0147120 | A1* | 5/2014 | Patel .................. H04J 14/0257 398/79 |

OTHER PUBLICATIONS

Written Opinion of the International Searching Authority for International Application No. PCT/SE2014/050758, dated Aug. 21, 2014, 10 pages.

Roy et al: "Filter design using radial basis function neural network and genetic algorithm for improved operational health monitoring," Applied Soft Computing, Elsevier, Amsterdam, NL, vol. 6, No. 2, Jan. 1, 2006, XP024959592; pp. 154-169.

Angelou et al: "A Novel Monitor Placement Algorithm for Accurate Performance Monitoring in Optical Networks", OSA/OFC/NFOEC 2011, JWA53.pdf; © 2010 Optical Society of America; OCIS codes: (060.4250) Networks; (060.4510) Optical communications; 3 pages.

Blanton et al: "A Framework for an On-Demand Measurement Service", Technical report, Purdue University, 2008; 16 pages. Retrieved from the internet: http://www.cs.purdue.edu/homes/fahmy/reports/measurement.pdf.

Hedayat et al: "A Two-Way Active Measurement Protocol (TWAMP)", RFC 5357, Oct. 2008. Standards Track, 27 pages.

Huang et al: "Measurement-Aware Monitor Placement and Routing: A Joint Optimization Approach for Network-Wide Measurements", IEEE Transactions on Network and Service Management, vol. 9, No. 1, Mar. 2012, pp. 48-59.

ITU-T G.8013/Y.1731 (Nov. 2013), "OAM functions and mechanisms for Ethernet based networks", International Telecommunication Union, Series G: Transmission Systems and Media, Digital Systems and Networks; Packet over Transport aspects—Ethernet over Transport aspects; Series Y: Global Information Infrastructure, Internet Protocol Aspects and Next-Generation Networks; 95 pages.

Johnsson et al: "Online Network Performance Degradation Localization using Probabilistic Inference and Change Detection", Network Operations and Management Symposium (NOMS), 2014 IEEE; May 5-9, 2014, 8 pages.

Mitchell: "An introduction to genetic algorithms." Cambridge, Massachusetts London, England, Fifth printing 3 (1999), 162 pages.

Natu et al: "Probe Station Placement for Fault Diagnosis", Global Telecommunications Conference, 2007. Globecom '07. IEEE; Nov. 26-30, 2007; pp. 113-117.

Postel: "Internet Control Message Protocol", DARPA Internet Program Protocol Specification; Sep. 1981, Network Working Group, RFC: 792, 21 pages.

Boutros et al: "MPLS Transport Profile Lock Instruct and Loopback Functions," Rfc 6435, Nov. 2011, 13 pages.

Busi et al: "Operations, Administration, and Maintenance Framework for MPSS-Based Transport Networks," Internet Engineering Task Force (IETF) RFC: 6371, Informational, ISSN:2070-1721, 64 pages.

Boote et al: "Instantiating a Global Network Measurement Framework," Report No. LBNL-1452E; 10 pages.

\* cited by examiner

AUTOMATED PLACEMENT OF MEASUREMENT ENDPOINT NODES IN A NETWORK

CROSS REFERENCE TO RELATED APPLICATION

This application is a 35 U.S.C, § 371 national stage application of PCT International Application No. PCT/SE2014/050758, filed in the English language on 19 Jun. 2014, the disclosure and content of which is incorporated by reference herein in its entirety.

TECHNICAL FIELD

The embodiments relate generally to determining performance parameters of a network and, in particular, to mechanisms for automated placement of measurement endpoint nodes in a network.

BACKGROUND

It is often valuable to determine the real-time performance characteristics of a network between two network nodes, such as, by way of non-limiting example, one-way delay performance characteristics, round-trip time performance characteristics, loss performance characteristics, jitter performance characteristics, or throughput performance characteristics. Such performance characteristics may be useful, for example, for identifying which communication links, or communication paths, are the cause of issues encountered by users of the network, or may soon be a cause of issues encountered by users of the network.

Often nodes in a network can be configured to implement, in addition to a core functionality implemented by the node, measurement endpoint (MEP) node functionality or measurement intermediate point (MIP) node functionality to aid in determining the performance characteristics of the network. MEP and MIP nodes typically utilize probe packets to determine the performance characteristics of the communication path between such nodes. The precise functionality of such MEP nodes may differ depending on the network protocol used on the network, or the type of network.

Determining where in a network topology to place MEP nodes for a relatively small network may be a relatively simple task that can be accomplished by a human simply looking at a visual representation of the network and manually configuring certain nodes of the network to implement the desired MEP node functionality. However, for relatively large networks that may comprise tens, hundreds, or even thousands of network nodes, and hundreds or thousands of communication links, manual configuration of MEP node placement may result in some communication links not being traversed by any probe packets, and/or may result in more nodes being configured as MEP nodes than necessary, generating unnecessary probe traffic on the network. Moreover, in large networks, nodes may be removed or added relatively frequently, requiring recalculation of MEP node placement. An ideal MEP node configuration would configure the fewest number of MEP nodes necessary to cover each communication link in the network. However, for a relatively large network comprising tens or hundreds of nodes, this determination may be impractical or may be impossible for a human to determine, especially where the network topology is changing relatively frequently.

SUMMARY

The embodiments relate to mechanisms for automatically determining where to place measurement endpoint (MEP) nodes in a network in an efficient and optimal manner. The embodiments utilize a genetic selection function to generate successive generations of structures, referred to herein as chromosomes, that identify possible MEP node placements. The chromosomes are graded, or scored, with a fitness value based on a fitness function that quantifies the particular MEP node placement configuration identified in the chromosome. Successive generations may include chromosomes from a current generation that had relatively high fitness values, as well as new chromosomes generated based on one or more genetic operations, including, for example, an elite operation, a mutation operation, and/or a cross over operation. Once a threshold condition is met, an optimal chromosome from a successive chromosome generation is selected, and based on the optimal chromosome, each node in a subset of the nodes are sent a configuration command that configures the nodes to operate as MEP nodes.

In one embodiment, a method is provided. Network topology information that identifies a plurality of nodes in a network and a plurality of communication links is accessed. Each communication link interconnects a pair of the plurality of nodes. An initial chromosome generation comprising a plurality of chromosomes is established. Each chromosome in the initial chromosome generation comprises a structure that identifies each node in the plurality of nodes that has an MEP capability and that includes for each node an MEP state indicator. A succession of a plurality of chromosome generations beginning with the initial chromosome generation is generated by evolving each chromosome generation into a successive chromosome generation based on a genetic selection function and a fitness function until a threshold condition is met. An optimal chromosome from a successive chromosome generation is determined. Based on the MEP state indicator in the optimal chromosome, a configuration command that configures each node to operate as an MEP node is sent to each node in a subset of the plurality of nodes.

In one embodiment, the threshold condition comprises determining that a respective chromosome in a successive chromosome generation meets a threshold fitness value based on the fitness function. In another embodiment, the threshold condition comprises generating at least a predetermined number of successive generations.

In one embodiment, evolving each chromosome generation into a successive chromosome generation includes determining, by the fitness function, based at least in part on the network topology information and at least two MEP states, fitness values for a plurality of chromosomes in a current chromosome generation of the plurality of chromosome generations. A successive chromosome generation is generated from the current chromosome generation based on the fitness values and the genetic selection function that performs a genetic operation, comprising at least one of an elite operation, a mutation operation, and a cross over operation, to at least partially populate the successive chromosome generation with new chromosomes.

In one embodiment, the fitness function determines a fitness value for each chromosome in a chromosome generation at least in part by maintaining a structure that identifies the plurality of communication links in the network. Based on the network topology information, for each unique pair of nodes designated in each chromosome as having an MEP state indicator in an MEP ON state, a path between the unique pair of nodes is determined. The communication links that make up the path are determined for each path. For each communication link that makes up the path, a value maintained in the structure to indicate the communication link is covered is altered.

In another embodiment, an apparatus for designating some nodes as measurement endpoint (MEP) nodes in a network is provided. The apparatus includes a communications interface and a processor coupled to the communications interface. The processor is configured to access network topology information that identifies a plurality of nodes in a network and a plurality of communication links, each communication link interconnecting a pair of the plurality of nodes. An initial chromosome generation comprising a plurality of chromosomes is established, each chromosome in the initial chromosome generation comprising a structure that identifies each node in the plurality of nodes that has an MEP capability and that includes for each node an MEP state indicator. A succession of a plurality of chromosome generations beginning with the initial chromosome generation is generated by evolving each chromosome generation into a successive chromosome generation based on a genetic selection function and a fitness function until a threshold condition is met. An optimal chromosome from a successive chromosome generation is determined. Based on the MEP state indicator in the optimal chromosome, a configuration command that configures each node to operate as an MEP node is sent to each node in a subset of the plurality of nodes.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first chromosome" and "second chromosome," and does not imply a priority, a type, an importance, or other attribute, unless otherwise stated herein.

The embodiments relate to mechanisms for automatically determining where to place measurement endpoint (MEP) nodes in a network in an efficient and optimal manner. The embodiments utilize a genetic selection function to generate successive generations of structures, referred to herein as chromosomes, that identify possible MEP node placements. The chromosomes are graded, or scored, with a fitness value based on a fitness function that quantifies the particular MEP node placement identified in the chromosome. The particular MEP node placement may be identified, for example, through an MEP state indicator. Successive generations may include chromosomes from a current generation that had relatively high fitness values, as well as new chromosomes generated based on one or more genetic operations, including, for example, an elite operation, a mutation operation, and/or a cross over operation. Once a threshold condition is met, an optimal chromosome from a successive chromosome generation is selected, and based on the optimal chromosome, each node in a subset of the nodes are sent a configuration command that configures the nodes to operate as MEP nodes.

Figure 1:
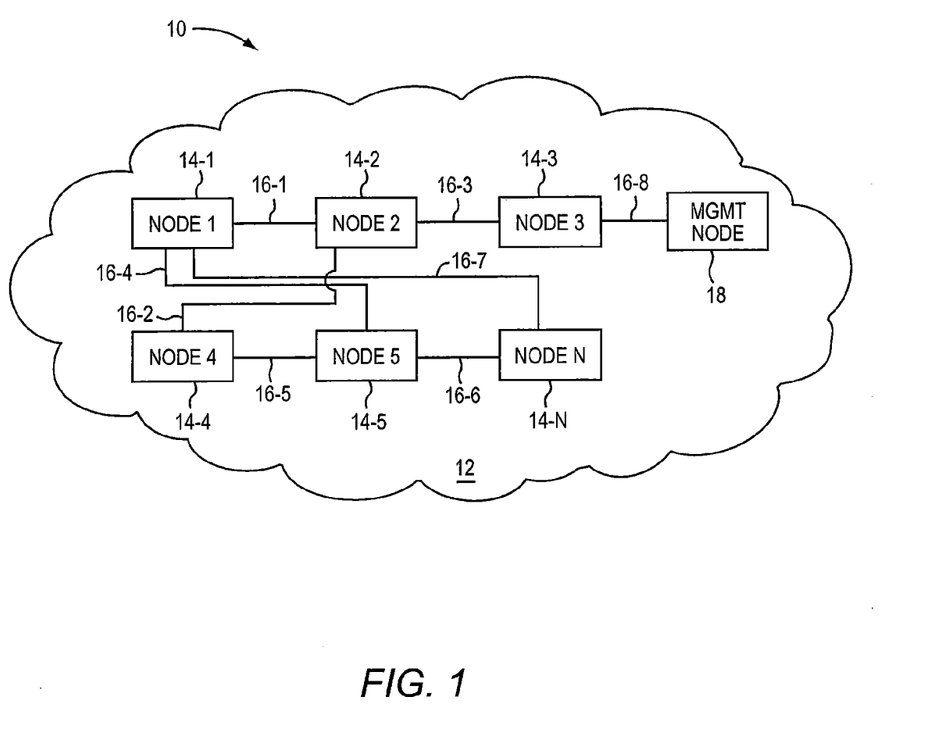
FIG. 1 is a block diagram of a system in which embodiments may be practiced.

FIG. 1 is a block diagram of a system 10 in which embodiments may be practiced. The system 10 includes a network 12 of network nodes 14-1-14-N (generally, nodes 14). The nodes 14 may comprise any suitable functionality that may be utilized in a communications or telecommunications network, including, for example, switching or routing functionality, specialized server functionality, file processing functionality, or the like. Each of the nodes 14 may also be able to, upon request, provide functionality as an MEP node. As will be discussed in greater detail herein, MEP node functionality helps identify performance characteristics of the network 12, including, by way of non-limiting example, one-way delay performance characteristics, round-trip time performance characteristics, loss performance characteristics, jitter performance characteristics, or throughput performance characteristics by means of active probing. The network 12 may comprise any suitable topology. In one embodiment, the network 12 comprises a mesh network topology.

The nodes 14 are communicatively coupled to one another via communication links 16-1-16-7 (generally, communication links 16). The communication links 16 may comprise any suitable communication medium for transferring data, including, by way of non-limiting example, a wired medium, a wireless medium, an optical medium, or any combination thereof. The nodes 14 may communicate with one another utilizing any desired communications protocol, including, by way of non-limiting example, transmission control protocol/internet protocol (TCP/IP), multi-protocol label switching (MPLS), or Ethernet. While for purposes of illustration and simplicity only six nodes 14 and seven communication links 16 are illustrated, in practice, the network 12 could include hundreds or thousands of nodes 14 and hundreds or thousands of communication links 16.

The network 12 also includes a network management node 18, referred to hereinafter as the management node 18. The management node 18 provides various management functionality for the network 12, including, as discussed in greater detail herein, the determination of which nodes 14 should be configured to operate as MEP nodes. Depending on the particular network 12, the management node 18 may sometimes be referred to as a network management station (NMS), an operations support system (OSS), a software defined network (SDN) controller, a Cloud Management System, or the like.

In response to one or more events, the management node 18 automatically determines which nodes 14 should be designated as MEP nodes. One such event may occur, by way of non-limiting example, upon a change in the network topology of the network 12, such as by the addition of a new node 14, the deletion of a node 14, the addition of a new communication link 16, the deletion of a communication link 16, or the like. Alternatively, the management node 18 may automatically determine which nodes 14 should be designated as MEP nodes in response to a command, or a request, from a network operator. In other embodiments, the management node 18 may automatically determine which nodes 14 should be designated as MEP nodes after the passage of a predetermined amount of time. The particular functionality of an MEP node may differ based on the architecture of the network 12, the protocol utilized in the network 12, or any number of other criteria. Such functionality may include, by way of non-limiting example, functionality as described by Internet Engineering Task Force Request for Comments 5357 Two-Way Action Measurement Protocol (IETF RFC 5357 TWAMP), Internet Engineering Task Force Request for Comments 792 Internet Control Message Protocol (IETF RFC 792 ICMP), International Telecommunication Union Telecommunication Standardization Sector Recommendation Y.1731 (ITU-T Recommendation Y.1731), or Internet Engineering Task Force Request for Comments 6371 (IETF RFC 6371), the contents of each of which are hereby incorporated by reference herein.

Figure 2:
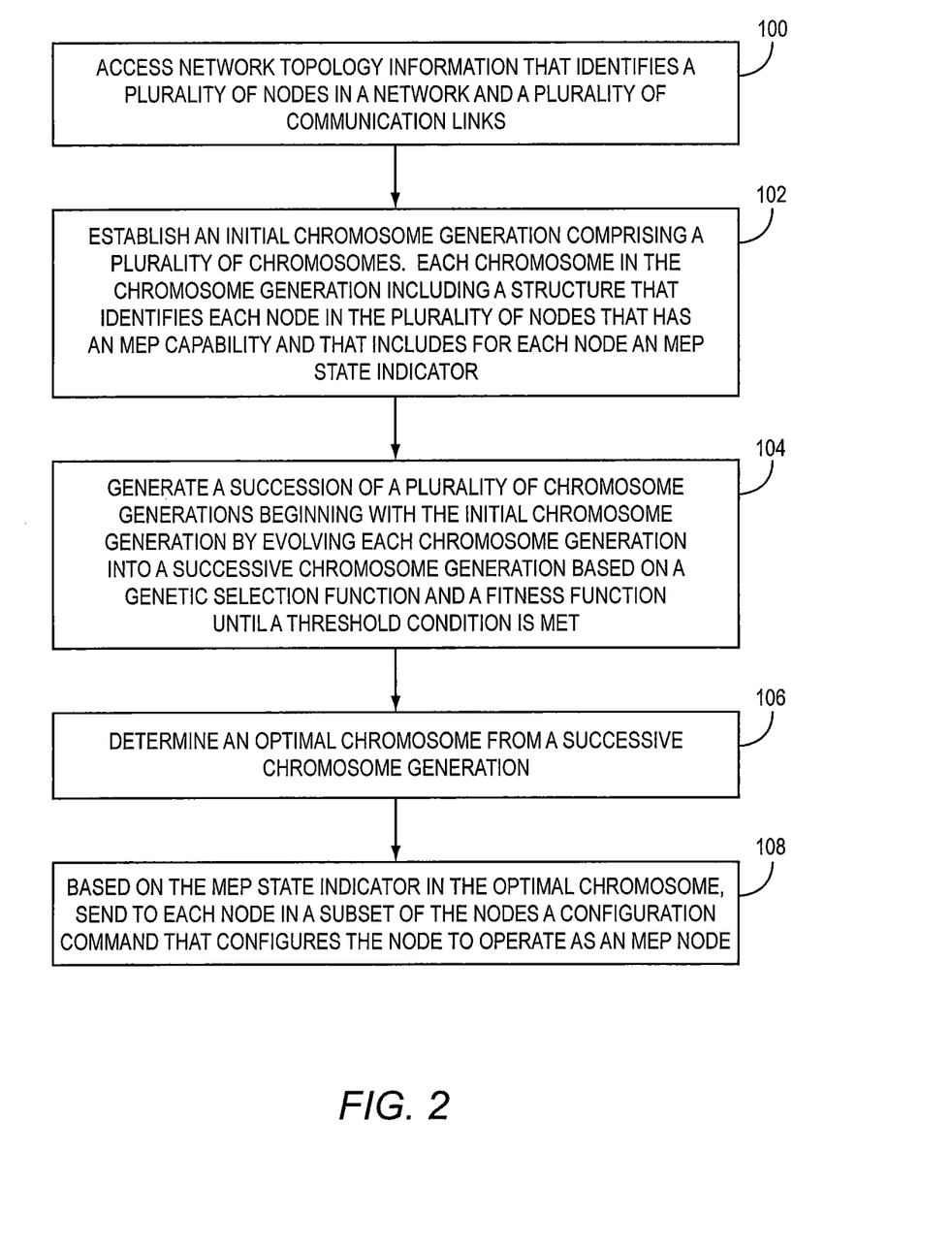
FIG. 2 is a flowchart of a method for automatically designating some nodes as MEP nodes in a network according to one embodiment.

FIG. 2 is a flowchart of a method for automatically designating some nodes 14 as MEP nodes in the network 12 according to one embodiment. FIG. 2 will be discussed in conjunction with FIG. 1. The management node 18 accesses network topology information that identifies the nodes 14, the communication links 16, and the particular pair of nodes 14 interconnected by each communication link 16 (FIG. 2, block 100). Such network topology information may be, for example, maintained on a storage device accessible by the management node 18. The management node 18 establishes an initial chromosome generation comprising a plurality of chromosomes (FIG. 2, block 102). Each chromosome comprises a data structure that identifies each node 14 in the plurality of nodes 14 in the network 12 that has an MEP capability, and for each such node 14, includes an MEP state indicator. For purposes of illustration, it will be assumed that all six nodes 14 are capable of operating as MEP nodes.

For purposes of illustration and simplicity, the MEP state indicator will be discussed herein as having one of two states: an ON state indicating that the respective node 14 is being evaluated by the fitness function as operating as an MEP node, and an OFF state indicating that the respective node 14 is being evaluated by the fitness function as not operating as an MEP node. However, the MEP state indicator may have any number of different states that may be considered by the fitness function during the determination of fitness values for a chromosome. For example, in some embodiments, it may be desirable to designate certain nodes 14 as sending MEP nodes (i.e. an MEP node that injects probe packets into the network 12), and other nodes 14 as receiving MEP nodes (i.e. an MEP node that only receives probe packets from another MEP node). In such embodiments, the MEP state indicator may have multiple different states, such as, for example, an MEP OFF state, an MEP sending state, and an MEP receiving state.

The initial chromosome generation may be created randomly by the management node 18, via input received from an operator, based on historical data that identifies chromosomes generated by previous automated MEP processing, or any combination of the above. The number of chromosomes in the initial chromosome generation may be any desired number, such as 10, 50, 100 or more. A larger number of chromosomes will take more computational power.

The management node 18 then generates a succession of a plurality of chromosome generations beginning with the initial chromosome generation by evolving each chromosome generation into a successive chromosome generation based on a genetic selection function and a fitness function until a threshold condition is met (FIG. 2, block 104). In one embodiment, a fitness function determines a fitness value for each chromosome in each generation, beginning with the initial chromosome generation. The fitness value may be based on any desired criteria, such as, for example, the largest number of communication links 16 that may be covered by the fewest number of MEP nodes. The term covered means that a communication link will be traversed by a packet sent on a communication path from a sending MEP node to a receiving MEP node.

The chromosomes in each generation may be ordered based on respective fitness values. The genetic selection function utilizes the current generation of chromosomes to generate a successive generation of chromosomes. The genetic selection function may select some chromosomes from the current generation for the successive generation based, for example, on the fitness values of the selected chromosomes. The genetic selection function may generate new chromosomes using a genetic operation, such as a mutation operation, and/or a cross over operation. In some embodiments, each generation has the same number of chromosomes. The process then repeats for the successive generation, and the fitness function determines a fitness value for each chromosome in the successive generation.

The chromosome generations continue to evolve into successive generations until a threshold condition is met. The threshold condition may comprise, by way of non-limiting example, a chromosome having a fitness value equal to or above a threshold fitness value. Alternatively, the threshold condition may comprise the generation of a predetermined number of chromosome generations. For example, the management node 18 may halt the evolution process after generating 50 chromosome generations.

The management node 18 then determines an optimal chromosome from a successive chromosome generation (FIG. 2, block 106). Where the threshold condition is a chromosome having a fitness value equal to or above a threshold fitness value, the management node 18 may simply determine that such chromosome is the optimal chromosome. Alternatively, if the threshold condition is a predetermined number of successive generations, the management node 18 may select the chromosome having the highest fitness value in the final chromosome generation as the optimal chromosome.

Based on the MEP state indicator in the optimal chromosome, the management node 18 sends to each node 14 in a subset of the nodes 14 a configuration command that configures the respective node 14 to operate as an MEP node (FIG. 2, block 108).

Figure 3:
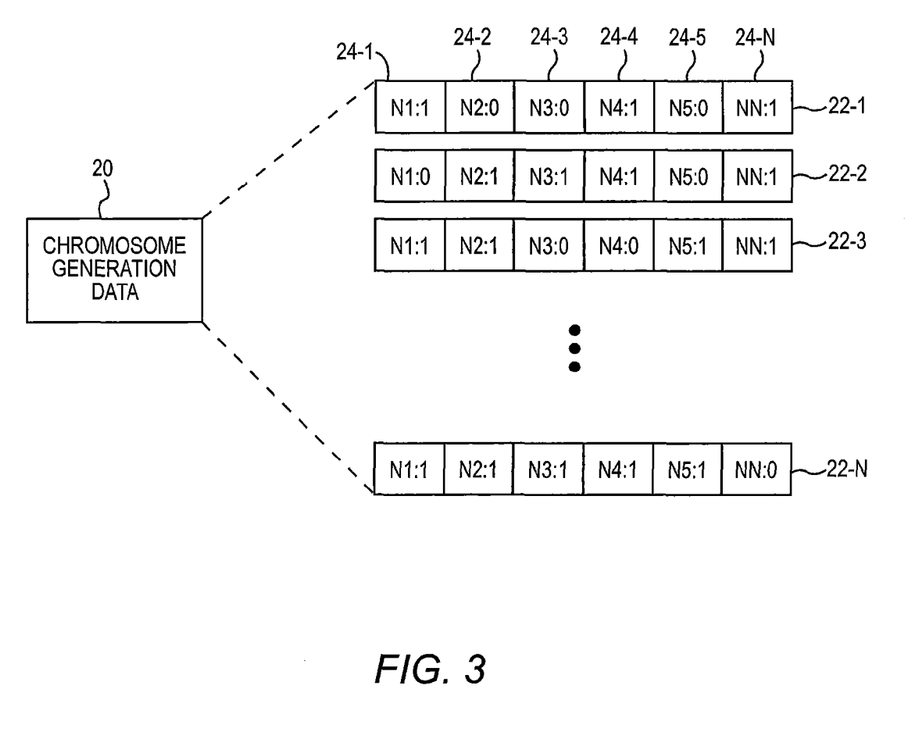
FIG. 3 is a block diagram illustrating example chromosome generation data for an example generation of chromosomes.

FIG. 3 is a block diagram illustrating example chromosome generation data 20 for an example generation of chromosomes 22-1-22-N (generally, chromosomes 22). Each chromosome 22 comprises a data structure that identifies each node 14 in the plurality of nodes 14 in the network 12 that has an MEP capability, and for each such node 14, the data structure includes an MEP state indicator. For example, the chromosome 22-1 includes a field 24-1 that identifies the node 14-1 and has an MEP state indicator of 1 associated with the node 14-1. The value may be interpreted by the fitness function as indicating the MEP ON state, such that the node 14-1 is evaluated by the fitness function as operating as an MEP node for purposes of determining a fitness value for the chromosome 22-1. The chromosome 22-1 includes a field 24-2 that identifies the node 14-2 and has an MEP state indicator of 0 associated with the node 14-2, a field 24-3 that identifies the node 14-3 and has an MEP state indicator of 0 associated with the node 14-3, a field 24-4 that identifies the node 14-4 and has an MEP state indicator of 1 associated with the node 14-4, a field 24-5 that identifies the node 14-5 and has an MEP state indicator of 0 associated with the node 14-5, and a field 24-N that identifies the node 14-N and has an MEP state indicator of 1 associated with the node 14-N.

Thus, for purposes of determining a fitness value, the chromosome 22-1 represents an MEP node designation wherein nodes 14-1, 14-4, and 14-N are operating as MEP nodes, and nodes 14-2, 14-3, and 14-5 are not operating as MEP nodes. Each of the chromosomes 22 would be evaluated by the fitness function, and an associated fitness value would be determined for each chromosome 22.

Figure 4A:
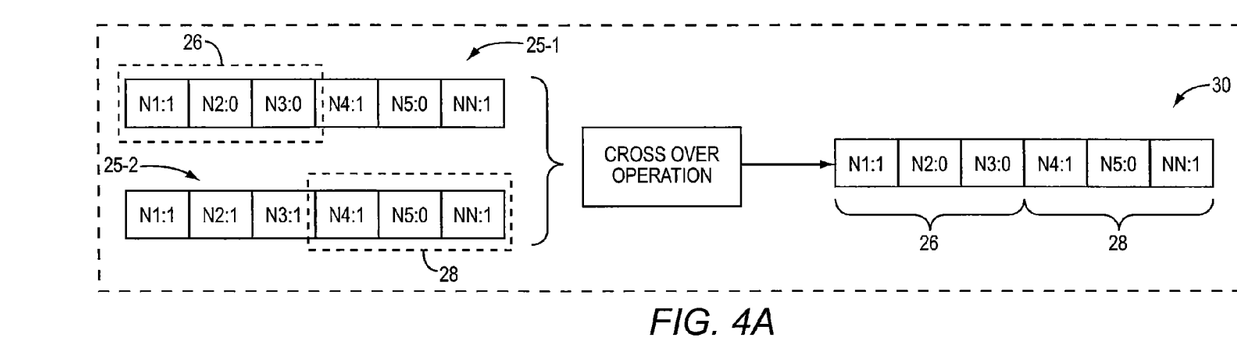
FIG. 4A is a block diagram illustrating a cross over genetic operation that may be utilized by the genetic selection function to generate new chromosomes according to one embodiment.

FIG. 4A is a block diagram illustrating a cross over genetic operation that may be utilized by the genetic selection function to generate new chromosomes according to one embodiment. The cross over genetic operation utilizes multiple existing chromosomes from a current chromosome generation to generate a new chromosome for a successive chromosome generation. In the example illustrated in FIG. 4A, the cross over genetic operation accesses two chromosomes 25-1 and 25-2 from a current chromosome generation, and selects a portion 26 from the chromosome 25-1 and a portion 28 from the chromosome 25-2 to generate a new chromosome 30 for a successive chromosome generation. The chromosomes 25-1, 25-2 may have been selected from the current chromosome generation by the management node 18 randomly, or based upon fitness values associated with the chromosomes 25-1, 25-2.

Figure 4B:
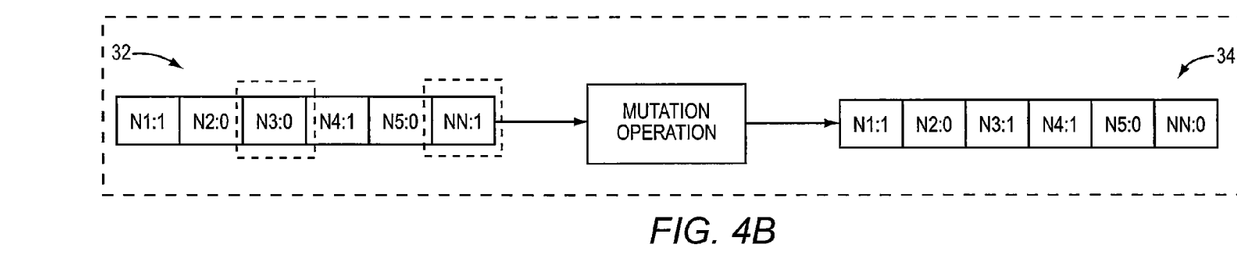
FIG. 4B is a block diagram illustrating a mutation genetic operation that may be utilized by the genetic selection function to generate new chromosomes according to one embodiment.

FIG. 4B is a block diagram illustrating a mutation genetic operation that may be utilized by the genetic selection function to generate new chromosomes according to one embodiment. The mutation genetic operation randomly mutates attributes of a chromosome in a current chromosome generation to create a new chromosome for a successive chromosome generation. The mutation genetic operation accesses a chromosome 32 from a current chromosome generation, and generates a new chromosome 34 from the chromosome 32 by randomly changing the MEP state indicator associated with the node 14-3 to change the MEP state indicator from the MEP OFF state to the MEP ON state, and the MEP state indicator associated with the node 14-N to change the MEP state indicator from the MEP ON state to the MEP OFF state.

Figure 4C:
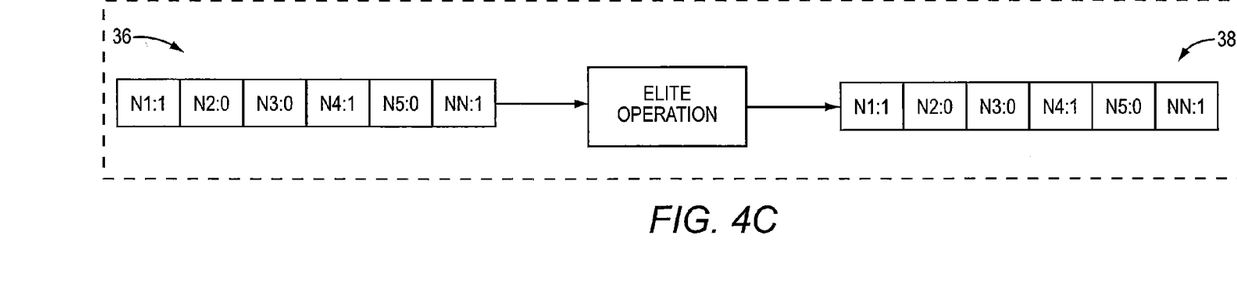
FIG. 4C is a block diagram illustrating an elite genetic operation that may be utilized by the genetic selection function to generate new chromosomes according to one embodiment.

FIG. 4C is a block diagram illustrating an elite genetic operation that may be utilized by the genetic selection function to generate new chromosomes according to one embodiment. The elite genetic operation selects a chromosome 36 from a current chromosome generation based on a fitness value associated with the chromosome 36, and populates the successive chromosome generation with a new chromosome 38, which is a copy of the chromosome 36. The elite genetic operation may be utilized where one or more chromosomes have associated fitness values above a predetermined threshold, for example.

Figure 5:
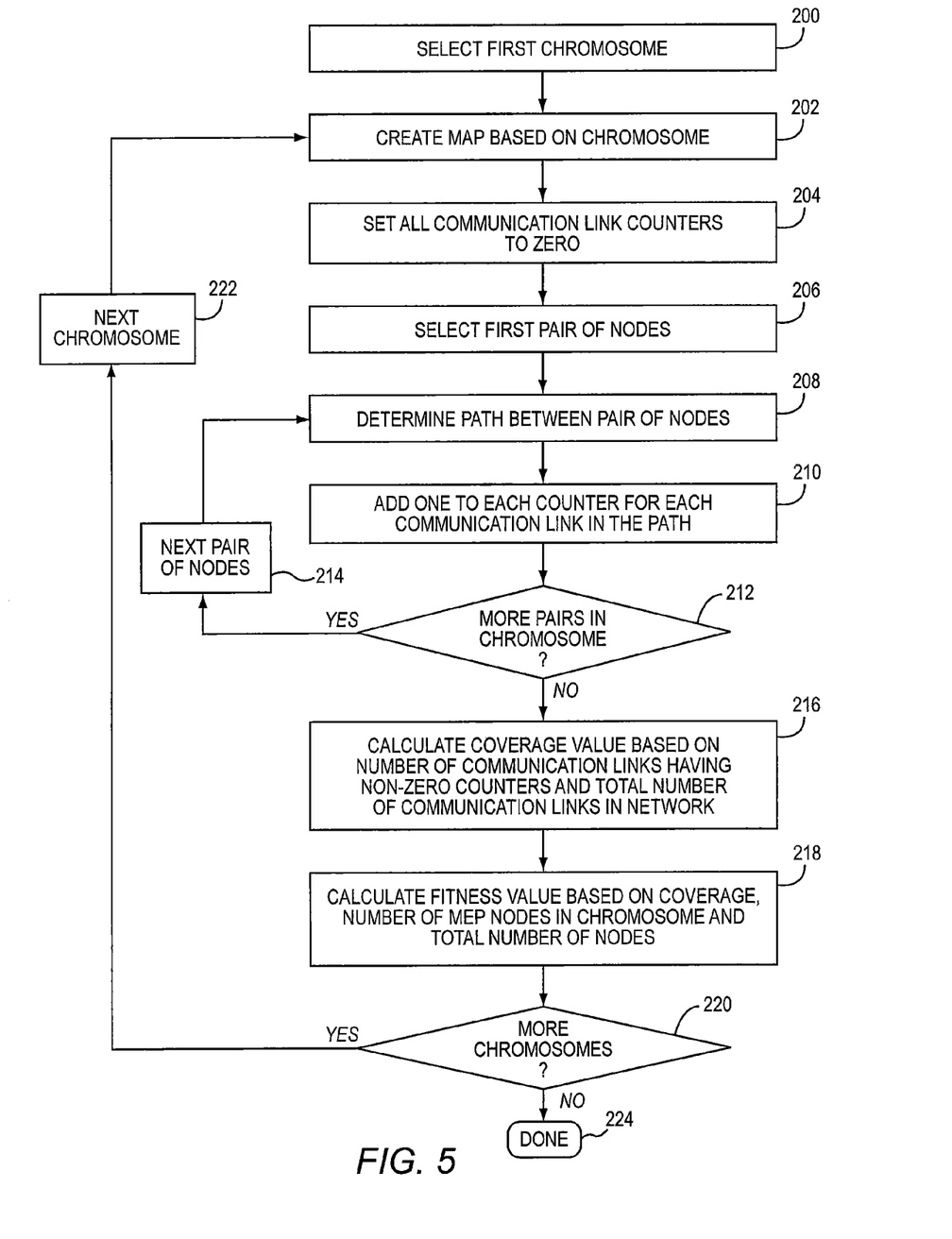
FIG. 5 is a flowchart of a fitness function that may be utilized to generate fitness values for chromosomes in a chromosome generation according to one embodiment.
Figure 6:
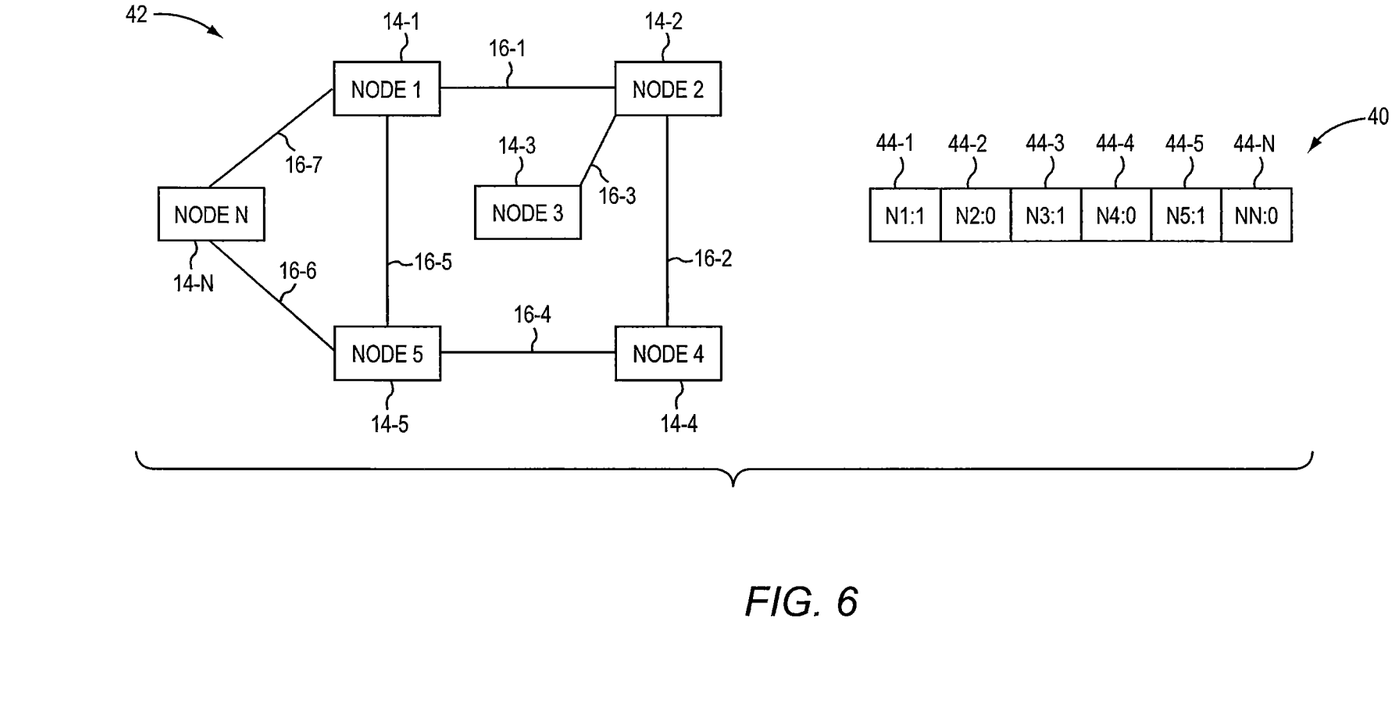
FIG. 6 is a block diagram illustrating the determination of a fitness value for a chromosome in accordance with the process illustrated in FIG. 5.

FIG. 5 is a flowchart of a fitness function that may be utilized to generate fitness values for chromosomes in a chromosome generation according to one embodiment. FIG. 6 is a block diagram illustrating the determination of a fitness value for a chromosome 40 in accordance with the process illustrated in FIG. 5. FIGS. 5 and 6 will be discussed together. Referring first to FIG. 5, the chromosome 40 is selected (FIG. 5, block 200). A data structure, such as a graph, or map 42, is generated by the fitness function, identifying the topology of the network 12 (FIG. 5, block 202). The map 42 identifies the nodes 14 and the communication links 16 between such nodes 14. Note that for purposes of illustration the communication link 16-8 between the management node 18 and the node 14-3 is not represented or considered in the determination of a fitness value. A variable, or counter, is maintained for each communication link 16, and is initially set to a value of zero (FIG. 5, block 204). A first pair of nodes 14 that are identified by the chromosome 40 as being in the MEP ON state are selected (FIG. 5, block 206). In this example, as indicated by the fields 44-1 and 44-3 of the chromosome 40, the pair of nodes 14-1 and 14-3 may be selected.

The fitness function then determines a path between the nodes 14-1-14-3 (FIG. 5, block 208). A path comprises one or more communication links 16 that facilitate communication between the node 14-1 and the node 14-3. Any desired mechanism for determining a path may be utilized. In one example, an Open Shortest Path First (OSPF) path determination algorithm may be utilized to determine a path between the node 14-1 and 14-3. In this example, assume that the path between nodes 14-1 and 14-3 comprises the communication links 16-1 and 16-3. The counters associated with the communication links 16-1 and 16-3 are each incremented by one (FIG. 5, block 210).

It is determined if additional pairs of nodes 14 are designated as being in the MEP ON state (FIG. 5, block 212). In this example, based on fields 44-1 and 44-5 in the chromosome 40, the pair of nodes 14-1 and 14-5 are designated as being in the MEP ON state. Thus, the process repeats for the pair of nodes 14-1 and 14-5, and a path between the nodes 14-1 and 14-5 is determined (FIG. 5, blocks 214, 208). In this example, assume that the path between nodes 14-1 and 14-5 comprises the communication link 16-5. The counter associated with the communication link 16-5 is incremented by one (FIG. 5, block 210).

It is determined if additional pairs of nodes 14 are designated as being in the MEP ON state (FIG. 5, block 212). In this example, based on fields 44-3 and 44-5 in the chromosome 40, the pair of nodes 14-3 and 14-5 are designated as being in the MEP ON state. Thus, the process repeats for the pair of nodes 14-3 and 14-5, and a path between the nodes 14-3 and 14-5 is determined (FIG. 5, blocks 214, 208). In this example, assume that the path between nodes 14-3 and 14-5 comprises the communication links 16-3, 16-2, and 16-4. The counters associated with the communication links 16-3, 16-2, and 16-4 are each incremented by one (FIG. 5, block 210).

It is determined that no additional pairs of nodes 14 are identified as being in the MEP ON state (FIG. 5, block 212). The fitness function determines a coverage value C, sometimes referred to herein as a measurement of coverage C, based on the number of communication links 16 that have a counter greater than zero and a total number of communication links 16 in the network (FIG. 5, block 216). In one embodiment, the coverage value C is determined substantially in accordance with the following formula:

$$C = \frac{t}{T}$$

wherein t equals the total number of the communication links 16 that are in at least one path between at least one unique pair of nodes 14, and T equals a total number of communication links 16 in the network 12.

Since the counters for five communication links 16 have a value greater than zero, as discussed above, and since there are a total of seven communication links 16 in the map 42, the coverage value C in this example is 5/7. According to one embodiment, the fitness function then determines a fitness value based on the coverage value (FIG. 5, block 218), in accordance with the following formula:

if the coverage value is less than one, then

Fitness value=2−$m/|G|$, wherein m=number of nodes 14 identified in the chromosome as being in the MEP ON state, and |G|=total number of nodes 14 identified in the chromosome; and if the coverage value is equal to one, then Fitness value=$m/|G|$, wherein m=number of nodes 14 identified in the chromosome as being in the MEP ON state, and |G|=total number of nodes 14 identified in the chromosome.

The fitness value is therefore 2−3/6, or 1.5.

A fitness value greater than a value of 1 and less than a value of 2 indicates that full coverage has not been achieved. A fitness value less than one indicates a solution wherein all communication links 16 are covered.

The fitness function then determines if additional chromosomes in the chromosome generation remain to be processed; if so, the process repeats (FIG. 5, blocks 220, 222). If no more chromosomes remain to be processed, then the fitness function is complete for that respective chromosome generation (FIG. 5, blocks 220, 224).

Figure 7:
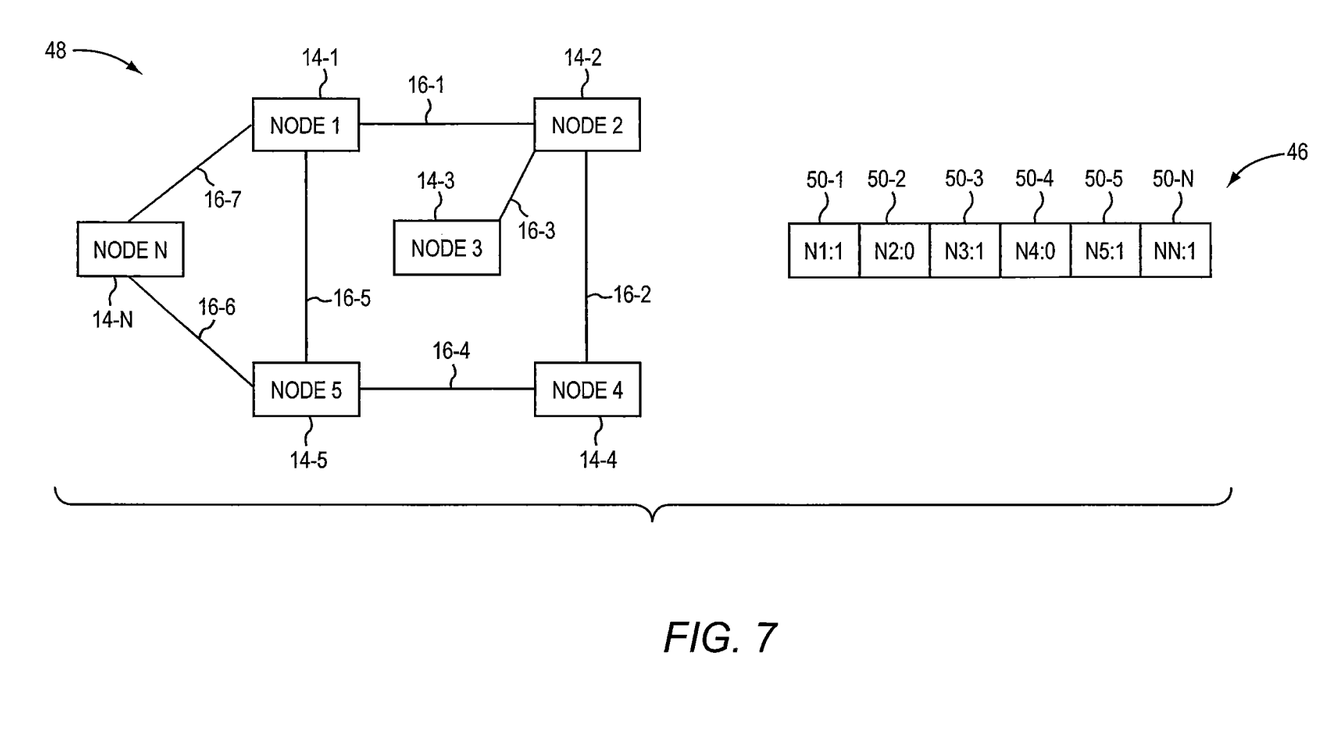
FIG. 7 is a block diagram illustrating the determination of a fitness value for another chromosome in accordance with the process illustrated in FIG. 5.

FIG. 7 is a block diagram illustrating the determination of a fitness value for a chromosome 46 in accordance with the process illustrated in FIG. 5. Assume for purposes of illustration that the chromosome 46 is in the same chromosome generation as the chromosome 46 discussed with regard to FIG. 6. The fitness function generates a data structure, such as a graph, or map 48, identifying the topology of the network 12. The map 48 identifies the nodes 14 and the communication links 16 between such nodes 14. A variable, or counter, is maintained for each communication link 16, and is initially set to a value of zero. A first pair of nodes 14 that are identified by the chromosome 46 as being in the MEP ON state are selected. In this example, as indicated by the fields 50-1 and 50-3 of the chromosome 46, the pair of nodes 14-1 and 14-3 may be selected.

The fitness function then determines a path between the nodes 14-1 and 14-3. In this example, assume that the path between nodes 14-1 and 14-3 comprises the communication links 16-1 and 16-3. The counters associated with the communication links 16-1 and 16-3 are each incremented by one.

The pair of nodes 14-1, 14-5 are then selected based on the fields 50-1 and 50-5. The fitness function then determines a path between the nodes 14-1 and 14-5. In this example, assume that the path between nodes 14-1 and 14-5 comprises the communication link 16-5. The counter associated with the communication link 16-5 is incremented by one.

The pair of nodes 14-1, 14-N are then selected based on the fields 50-1 and 50-N. The fitness function then determines a path between the nodes 14-1 and 14-N. In this example, assume that the path between nodes 14-1 and 14-N comprises the communication link 16-7. The counter associated with the communication link 16-7 is incremented by one.

The pair of nodes 14-3, 14-5 are then selected based on the fields 50-3 and 50-5. The fitness function then determines a path between the nodes 14-3 and 14-5. In this example, assume that the path between nodes 14-3 and 14-5 comprises the communication links 16-3, 16-2, and 16-4. The counters associated with the communication links 16-3, 16-2, and 16-4 are incremented by one.

The pair of nodes 14-3, 14-N are then selected based on the fields 50-3 and 50-N. The fitness function then determines a path between the nodes 14-3 and 14-N. In this example, assume that the path between nodes 14-3 and 14-N comprises the communication links 16-3, 16-1, and 16-7. The counters associated with the communication links 16-3, 16-1, and 16-7 are incremented by one.

The pair of nodes 14-5, 14-N are then selected based on the fields 50-5 and 50-N. The fitness function then determines a path between the nodes 14-5 and 14-N. In this example, assume that the path between nodes 14-5 and 14-N comprises the communication link 16-6. The counter associated with the communication link 16-6 is incremented by one.

Based on the above, the counters associated with all seven communication links, 16-1-16-7 are greater than zero. The coverage value is thus 7/7. Since the coverage value=1, the fitness value is determined in accordance with the following:

Fitness value=$m/|G|$, wherein m=number of nodes 14 identified in the chromosome as being in the MEP ON state, and |G|=total number of nodes 14 identified in the chromosome.

The fitness value is therefore 4/6. As discussed above, a fitness value less than 1 indicates full coverage has been achieved, and thus, the chromosome 46 is a more preferable chromosome than the chromosome 40.

Once an optimal chromosome has been determined, the management node 18 then sends configuration commands to the nodes 14 identified in the optimal chromosome as being in the MEP ON state that configures such nodes 14 to operate as MEP nodes. The configuration command may also include a list that identifies each node 14 that is being configured to operate as an MEP node.

Figure 8:
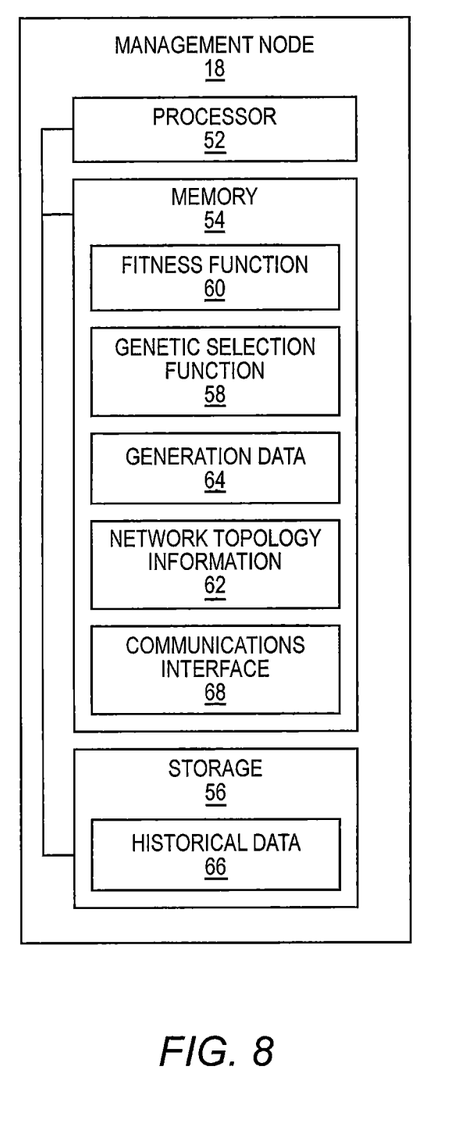
FIG. 8 is a block diagram illustrating a management node according to one embodiment.

FIG. 8 is a block diagram illustrating the management node 18 according to one embodiment. The management node 18 may comprise any computing or processing device having firmware, hardware, and/or capable of executing software instructions suitable to implement the functionality described herein. The management node 18 includes a processor 52 and a memory 54. The processor 52 can be any commercially available or proprietary processor.

The memory 54 may include non-volatile memory (e.g., read only memory (ROM), erasable programmable read only memory (EPROM), electrically erasable programmable read only memory (EEPROM), etc.) and/or volatile memory (e.g., random access memory (RAM)). The management node 18 may further include or be coupled to a computer-readable storage 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 56 and other drives, associated with computer-readable media and computer-usable media, may provide non-volatile storage of data, data structures, computer-executable instructions, and the like. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of modules can be stored in the computer-readable storage 56 and in the memory 54, including an operating system and one or more program modules, such as a genetic selection function 58 and a fitness function 60, which may implement the functionality described herein in whole or in part.

All or a portion of the embodiments may be implemented as a computer program product stored on a transitory or non-transitory computer-usable or computer-readable storage medium, such as the computer-readable storage 56, which includes complex programming instructions, such as complex computer-readable program code, configured to cause the processor 52 to carry out the steps described herein. Thus, the computer-readable program code can comprise software instructions for implementing the functionality of the embodiments described herein when executed on the processor 52. The processor 52, in conjunction with the genetic selection function 58 and the fitness function 60, may serve as a controller for the management node 18 that is configured to, or adapted to, implement the functionality described herein.

The memory 54 may also store network topology information 62 that identifies the network topology of the network 12, including identification of the nodes 14 and communication links 16. Generation data 64 may comprise the chromosomes for a particular chromosome generation being processed. The computer-readable storage 56 may also maintain historical data 66, which may include previous determined optimal chromosomes. The management node 18 may also include a communications interface 68, suitable for communicating with the node 14-3, and/or other computing devices in the network 12.

The following acronyms are used throughout this disclosure:
EEPROM Electrically Erasable Programmable Read Only Memory
EIDE Enhanced Integrated Drive Electronics
EPROM Erasable Programmable Read Only Memory
HDD Hard Disk Drive
ICMP Internet Control Message Protocol
IETF Internet Engineering Task Force
IP Internet Protocol
ITU-T International Telecommunication Union Telecommunication Standardization Sector
MEP Measurement Endpoint
MIP Measurement Intermediate Point
MPLS Multiprotocol Label Switching
NMS Network Management Station
OSPF Open Shortest Path First
OSS Operations Support System
SDN Software Defined Network
RAM Random Access Memory
RFC Request for Comments
ROM Read Only Memory
SATA Serial Advanced Technology Attachment
TCP Transmission Control Protocol
TWAMP Two-Way Action Measurement Protocol Those skilled in the art will recognize improvements and modifications to the preferred embodiments of the disclosure. All such improvements and modifications are considered within the scope of the concepts disclosed herein and the claims that follow.

What is claimed is:

1. A method for dynamically designating and configuring some nodes as measurement endpoint (MEP) nodes in a network, comprising:
   a) accessing, by a device comprising a processor and a communications interface configured to communicate with other nodes in the network, network topology information, via the communications interface, that identifies a plurality of nodes in a network and a plurality of communication links, each communication link interconnecting a pair of the plurality of nodes;
   b) establishing an initial chromosome generation comprising a plurality of chromosomes, each chromosome in the initial chromosome generation comprising a structure that identifies each node in the plurality of nodes that has an MEP capability and that includes for each node an MEP state indicator indicating operation as a MEP node;
   c) generating a succession of a plurality of chromosome generations beginning with the initial chromosome generation by evolving each chromosome generation into a successive chromosome generation based on a genetic selection function and a fitness function until a threshold condition is met, wherein the threshold condition comprises at least one of: determining that a respective chromosome in a successive chromosome generation meets a threshold fitness value based on the fitness function and generating at least a predetermined number of successive generations;
   d) determining an optimal chromosome from the succession of the plurality of chromosome generations;
   e) based on the MEP state indicator for each of the plurality of nodes in the optimal chromosome, sending, via the communications interface, to each node in a subset of the plurality of nodes a configuration command that configures each node to operate as an MEP node, wherein operating as an MEP node includes identifying performance characteristics of the network; and f) repeating steps a) to e) upon detecting a change in the network topology.

2. The method of claim 1, wherein determining the optimal chromosome comprises determining that the respective chromosome is the optimal chromosome.

3. The method of claim 1, wherein evolving each chromosome generation into the successive chromosome generation comprises:
   determining, by the fitness function, based at least in part on the network topology information and the MEP state indicator, fitness values for the plurality of chromosomes in a current chromosome generation of the plurality of chromosome generations; and
   generating the successive chromosome generation from the current chromosome generation based on the fitness values and the genetic selection function that performs a genetic operation comprising at least one of an elite operation, a mutation operation, and a cross over operation, to at least partially populate the successive chromosome generation with new chromosomes.

4. The method of claim 3, wherein the elite operation is performed to select a subset of chromosomes from the current chromosome generation for the successive chromosome generation based on the fitness values of the subset of chromosomes.

5. The method of claim 3, wherein the mutation operation is performed to generate at least one new chromosome for the successive chromosome generation by selecting a respective chromosome from the current chromosome generation, randomly choosing at least one node identified in the respective chromosome, and altering the MEP state of the at least one node to generate the at least one new chromosome.

6. The method of claim 3, wherein the cross over operation is performed to generate at least one new chromosome for the successive chromosome generation by selecting a first chromosome and a second chromosome from the current chromosome generation, selecting a first subset of nodes and respective MEP states from the first chromosome and a second subset of nodes and respective MEP states from the second chromosome, and generating the at least one new chromosome based on the first subset of nodes and the respective MEP states from the first chromosome and the second subset of nodes and the respective MEP states from the second chromosome.

7. The method of claim 1, wherein the fitness function determines a fitness value for each chromosome in a chromosome generation at least in part by:
   maintaining a structure that identifies the plurality of communication links in the network;
   determining, based on the network topology information, for each unique pair of nodes designated in each chromosome as having an MEP state indicator in an MEP ON state, a path between the unique pair of nodes;
   determining for each path communication links that make up the path; and
   altering, for each communication link that makes up the path, a value maintained in the structure to indicate the communication link is in the path between the unique pair of nodes.

8. The method of claim 7, wherein determining the path between the unique pair of nodes comprises determining a shortest path between the unique pair of nodes.

9. The method of claim 7, wherein each fitness value is based at least in part on a number of communication links of the plurality of communication links that are in at least one path between at least one unique pair of nodes, and a number of nodes designated as being in the MEP ON state.

10. The method of claim 7, wherein the fitness function determines the fitness value substantially in accordance with a function comprising:

$$f(m, |G|, C) = \begin{cases} 2 - m/|G| & C < 1 \\ m/|G| & C = 1 \end{cases}$$

wherein m is a number of nodes in a chromosome wherein the associated MEP state indicator indicates an MEP ON state, |G| is a total number of nodes identified in the chromosome, and C is a measurement of coverage.

11. The method of claim 10, wherein the measurement of coverage, C, is determined substantially in accordance with the following formula:

$$C = \frac{t}{T}$$

wherein t equals the total number of communication links in at least one path between at least one unique pair of nodes, and T equals a total number of communication links in the network.

12. The method of claim 1, wherein each successive chromosome generation comprises a same number of chromosomes.

13. The method of claim 1, wherein the network comprises a mesh network topology.

14. The method of claim 1, wherein establishing the initial chromosome generation comprising the plurality of chromosomes comprises accessing stored chromosomes from a memory.

15. The method of claim 1, wherein establishing the initial chromosome generation comprising the plurality of chromosomes comprises receiving operator input defining the plurality of chromosomes.

16. The method of claim 1, wherein establishing the initial chromosome generation comprising the plurality of chromosomes comprises randomly generating at least some of the plurality of chromosomes.

17. An apparatus for dynamically designating and configuring some nodes as measurement endpoint (MEP) nodes in a network, comprising:
   a communications interface; and
   a processor coupled to the communications interface, the processor configured to:
   a) access, via the communications interface, network topology information that identifies a plurality of nodes in a network and a plurality of communication links, each communication link interconnecting a pair of the plurality of nodes;
   b) establish an initial chromosome generation comprising a plurality of chromosomes, each chromosome in the initial chromosome generation comprising a structure that identifies each node in the plurality of nodes that has an MEP capability and that includes for each node an MEP state indicator indicating operation as a MEP node;
   c) generate a succession of a plurality of chromosome generations beginning with the initial chromosome generation by evolving each chromosome generation into a successive chromosome generation based on a genetic selection function and a fitness function until a threshold condition is met, wherein the threshold condition comprises at least one of: determining that a respective chromosome in a successive chromosome generation meets a threshold fitness value based on the fitness function and generating at least a predetermined number of successive generations;

d) determine an optimal chromosome from the succession of the plurality of chromosome generations;

e) based on the MEP state indicator for each of the plurality of nodes in the optimal chromosome, send, via the communications interface, to each node in a subset of the plurality of nodes a configuration command that configures each node to operate as an MEP node, wherein operating as an MEP node includes identifying performance characteristics of the network; and f) repeating steps a) to e) upon detecting a change in the network topology.

18. The apparatus of claim 17, wherein to evolve each chromosome generation into the successive chromosome generation the processor is further configured to:

determine, by the fitness function, based at least in part on the network topology information and the MEP state indicator, fitness values for a plurality of chromosomes in a current chromosome generation of the plurality of chromosome generations; and generate the successive chromosome generation from the current chromosome generation based on the fitness values and the genetic selection function that performs a genetic operation comprising at least one of an elite operation, a mutation operation, and a cross over operation, to at least partially populate the successive chromosome generation with new chromosomes.

19. A non-transitory computer-readable storage medium, having stored thereon a computer program for dynamically designating and configuring some nodes as measurement endpoint (MEP) nodes in a network, the computer program including instructions configured to cause a processor to carry out steps of:

a) accessing, via a communications interface configured to communicate with other nodes through the network, network topology information that identifies a plurality of nodes in a network and a plurality of communication links, each communication link interconnecting a pair of the plurality of nodes;

b) establishing an initial chromosome generation comprising a plurality of chromosomes, each chromosome in the initial chromosome generation comprising a structure that identifies each node in the plurality of nodes that has an MEP capability and that includes for each node an MEP state indicator indicating operation as a MEP node;

c) generating a succession of a plurality of chromosome generations beginning with the initial chromosome generation by evolving each chromosome generation into a successive chromosome generation based on a genetic selection function and a fitness function until a threshold condition is met, wherein the threshold condition comprises at least one of: determining that a respective chromosome in a successive chromosome generation meets a threshold fitness value based on the fitness function and generating at least a predetermined number of successive generations;

d) determining an optimal chromosome from the succession of the plurality of chromosome generations;

e) based on the MEP state indicator for each of the plurality of nodes in the optimal chromosome, sending, via the communications interface, to each node in a subset of the plurality of nodes a configuration command that configures each node to operate as an MEP node, wherein operating as an MEP node includes identifying performance characteristics of the network; and f) repeating steps a) to e) upon detecting a change in the network topology.

* * * * *